Patented June 24, 1930

1,765,678

UNITED STATES PATENT OFFICE

HANS PAUL KAUFMANN, OF JENA, AND MAX SCHUBERT, OF FECHENHEIM, NEAR FRANKFORT-ON-THE-MAIN, GERMANY, ASSIGNORS TO I. G. FARBENINDUSTRIE AKTIENGESELLSCHAFT, A CORPORATION OF GERMANY

PROCESS FOR INTRODUCING SULPHOCYANIC GROUPS INTO ORGANIC COMPOUNDS

No Drawing. Application filed March 6, 1928, Serial No. 259,602, and in Germany March 11, 1927.

In U. S. application of Hans Kaufmann Serial No. 130,770 filed August 21, 1926 a process has been described for introducing sulphocyanic groups into organic compounds by causing an inorganic sulphocyanic salt in a dissolved form and a halogen to act on the organic compound.

In our application Serial No. 183,228 filed April 12, 1927, it is pointed out that when the process is effected upon primary aromatic amines having the para-position to the aminogroup blocked, the primarily formed ortho-sulphocyanic derivatives are converted into new ring compounds of the thiazole series.

According to our present invention, the process for introducing sulphocyanic groups into organic compounds, particularly of the aromatic series, is modified or improved by the use of a solvent of a neutral character which is an equally good solvent for the organic compound as for the sulphocyanic salt. As examples of the solvent, alkylacetates, particularly methylacetate, and lower aliphatic alcohols, especially methylalcohol, may be named. These neutral solvents are not in every case unaffected by the action of the halogen and sulphocyanogen, and therefore in order to preserve the solvent from such action and prevent the formation of undesired by-products, the solvent may be saturated with an electrolyte, particularly with sodium bromide or chloride.

The process of our present invention is especially suitable for manufacturing ortho-sulphocyanic derivatives of aromatic amines having the para-position to the aminogroup blocked, since the conversion of these derivatives into ring compounds as described in our application Serial No. 183,228 is almost completely avoided.

We have further found that for producing ortho-sulphocyanic derivatives of primary aromatic amines having the para-position blocked, nascent sulphocyanogen is not necessarily applied but molecular sulphocyanogen may be used with similar good results. It is somewhat surprising that in this case also the course of the reaction is so rapid that the formation of by-products particularly polymerization products of sulphocyanogen does not take place.

It is further remarkable that the method of working is not limited to the use of anhydrous organic solvents, such as ether, carbon tetrachloride or carbon disulfide. In contradistinction to the statements of Söderbäck (Liebig's Annalen, Vol. 419, page 222 ff.) generally all organic solvents of a neutral character which are equally good solvents for the organic compound as for the sulphocyanogen radicle, hereinbefore mentioned can be used, particularly when preserved from the attack of the reacting agents, by being saturated with an electrolyte.

The ortho-arylaminosulphocyanic compounds thus obtained, are generally new products with exception of 1-sulphocyanogeno-2-naphthylamine and 2.4-disulpho-cyanogeno-1-naphthylamine which are described and claimed in U. S. application Serial No. 130,770. The ortho-arylaminosulphocyanic compounds are when dry crystalline substances having a definite melting point, they are converted into the isomeric aminothiazole compounds, which are the subject matter of our copending application Serial No. 183,228, particularly when treated in an acidic medium.

In order to further illustrate our invention, the following examples are given, the parts being by weight and all temperatures in centigrade degrees. We wish it however to be understood that we are not limited to the particular products nor reaction conditions mentioned therein.

*Example 1.*

To a solution of 30 parts of phenol and 75 parts of ammonium sulphocyanide in about 200 parts of methyl alcohol while stirring and cooling at about 15–20° a solution of 54 parts of bromine in about 100 parts of methyl alcohol is slowly added. After some time the mass is diluted with about 2000 parts of water and the reaction product is filtered off. The formed 4-sulphocyanogeno-phenol of the formula:

crystallizes from dilute methyl alcohol as colorless needles of 58° C. melting point.

Example 2.

42 parts of α-naphthol and 80 parts of ammonium sulphocyanide are dissolved in about 600 parts of methyl alcohol and while stirring at about 8–10° slowly a solution of 45 parts of bromine in about 150 parts of methyl alcohol is added. After some time the mass is diluted with about 2,500 parts of water and the precipitated 4-sulphocyanogeno-1-naphthol of the formula:

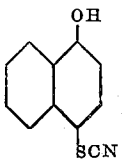

is filtered off. When recrystallized from dilute spirit, the almost colorless substance melts at 118°.

Example 3.

Into 360 parts of methyl alcohol saturated with potassium bromide 7 parts of 1-methyl-2-amino-5-chlorobenzene and about 25–30 parts of potassium sulphocyanide crystals are introduced. Then while stirring at about 10° a solution of 9 parts of bromine in 40 parts of methyl alcohol equally saturated is allowed to run in. After some time the new compound is separated by adding water to the reaction mixture. The 1-methyl-2-amino-3-sulphocyanogeno-5-chlorobenzene of the probable formula:

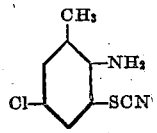

is easily soluble in spirit, glacial acetic acid, benzene and ether. When recrystallized from dilute spirit it is obtained as colorless needles melting at about 102°. Its diazo-compound yields a red dyestuff, when combined with R-salt.

One may also proceed as follows: In order to prepare a solution of molecular sulpho-cyanogen methyl alcohol is saturated with potassium bromide and into 80 parts thereof 16 parts of lead sulphocyanide are introduced. Then at about 5° a solution of 4, 5 parts of bromine in about 10–15 parts of methyl alcohol likewise saturated with an electrolyte is allowed to run in. When the color of bromine has disappeared the separated lead bromide is advantageously removed by filtration and the filtrate can be added to the aromatic amine to be sulpho-cyanogenized.

Instead of bromine, chlorine may be used or an agent yielding chlorine such as sulfuryl chloride.

In the preparation of a solution of molecular sulphocyanogen, instead of using an insoluble heavy metal sulphocyanide, such, for example, as lead sulphocyanide or mercury sulphocyanide, alkali or earth alkali salts of the sulphocyanic acid may be used with equally good results. For instance, a solution may be prepared by saturating methyl alcohol with common salt and introducing into 80 parts thereof 10 parts of potassium-sulphocyanide. Then at about 5° a solution of 4, 5 parts of bromine in about 10–15 parts of methyl alcohol likewise saturated with common salt is allowed to run in.

A solution of molecular sulphocyanogen in 90–100 parts of methyl alcohol, containing 2, 9 parts of free sulphocyanogen and prepared according to one of the methods above described, is gradually added at about 5–10°, to a solution of 3, 5 parts of 1-methyl-2-amino-5-chlorobenzene in about 40 parts of methyl alcohol preferably saturated with sodium bromide. After stirring for some time the 1-methyl-2-amino-3-sulphocyanogen-5-chlorobenzene formed is separated by adding water to the reaction mass. It is identical with the product described above.

Example 4

A mixture of 68 parts of para-phenetidine and 160 parts of sodium sulphocyanide is introduced into about 650 parts of methylacetate, then a solution of about 100 parts of bromine in 250 parts of methylacetate is slowly added. After stirring for some time the filtered solution is poured into about four times as much water. The dark precipitate thus formed is washed with sodium carbonate and dried. Recrystallized from ligroin the 1-ethoxy-3-sulphocyanogeno-4-amino-benzene obtained of the formula:

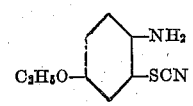

forms reddish crystals melting at 67°.

Instead of methylacetate as solvent methyl alcohol which is saturated with an electrolyte may be used with equally good result.

Example 5

To a solution of molecular sulphocyanogen in about 1000 parts of methylalcohol, containing 29 parts of free sulpho-cyanogen and prepared as described in example 3, at about 5-10° a solution of 36 parts of β-naphthylamine in 400-500 parts of methyl alcohol is allowed to run in. After some time the 1-sulphocyanogeno-2-naphthylamine formed is precipitated by adding water to the mixture. It is identical with the product described in example 10 of application Serial No. 130,770.

Example 6

17, 4 parts of 2-amino-7-naphtholether are dissolved in about 90 parts of methylacetate and to the solution a suspension of 38 parts of potassium sulphoncyanide in about 250 parts of methylacetate is added. Then while stirring at about 5° a solution of 15, 5 parts of bromine in 70 parts of methylacetate is allowed to run in. The reaction mixture is immediately poured on about 2,000 parts of ice-water and the precipitate thus formed is filtered off, washed and dried. The 1-sulphocyanogeno-2-amino-7-naphtholether of the probable formula:

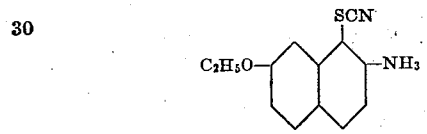

formed is soluble in cold glacial acetic acid and crystallizes from spirit as bright leaflets, sintering at about 185° and being thereby transformed into the thiazolcompound. The new product is soluble in concentrated sulphuric acid with a yellow color and a greenish fluorescence.

Example 7

20 parts of β-aminoanthracene are well mixed with 20 parts of ammonium sulphocyanide and 500 parts of methyl alcohol and into the suspension at about −5° a solution of 30 parts of bromine in 100 parts of methyl alcohol is allowed to run in while well stirring. After some time the precipitate formed is filtered off and washed. When recrystallized from spirit the new 1-sulphocyanogeno-2-amino-anthracene of the formula:

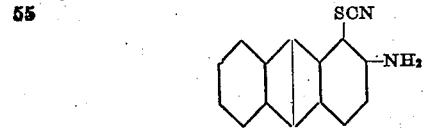

is obtained as golden yellow needles melting above 300°. It is difficultly soluble in aniline and chlorobenzene, insoluble in water. When warmed with a concentrated aqueous solution of sodium sulphide the compound dissolves and after cooling down the sodium salt of the formed 1-merkapto-2-amino anthracene separates as golden yellow crystals.

In an analogous manner the 2.6-diaminoanthracene yields the corresponding disulphocyanogeno compound, which can also be split off to the corresponding dimerkaptide when treated with an aqueous sodium sulphide solution.

We claim:

1. An improved process for introducing sulphocyanic groups into organic compounds which process comprises causing an inorganic sulphocyanic salt and a halogen to act on an organic compound in presence of a solvent of a neutral character which is an equally good solvent for the organic compound as for the sulphocyanic salt.

2. An improved process for introducing sulphocyanic groups into organic compounds which process comprises causing an inorganic sulphocyanic salt and a halogen to act on a primary aromatic amine having the para-position to the aminogroup blocked in presence of a solvent of a neutral character which is an equally good solvent for the amine as for the sulphocyanic salt.

3. An improved process for introducing sulphocyanic groups into organic compounds which process comprises causing an inorganic sulphocyanic salt and a halogen to act at temperatures below room temperature on a primary aromatic amine having the para-position to the aminogroup blocked in presence of a solvent of a neutral character which is an equally good solvent for the amine as for the sulphocyanic salt.

4. As new products ortho-aminosulphocyanic compounds corresponding probably to the general formula:

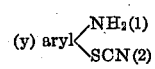

in which formula $y$ signifies that the para-position to the amino-group in the arylresidue is blocked and aryl means a residue of the benzene or anthracene series, which may contain further substituents, or a substituted residue of the naphthalene series, which products are when dry crystalline substances, having a definite melting point, being soluble in the usual organic solvents, diazotizable and capable of combining with azocomponents, forming isomeric thiazolic compounds when treated in an acidic medium.

5. As new products ortho-amino-sulphocyanic compounds of the benzene series corresponding probably to the general formula:

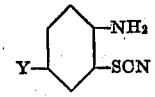

in which formula Y means a monovalent substituent and the benzene nucleus may contain further substituents, which products are when dry crystalline substances, having a definite melting point, soluble in the usual organic solvents, diazotizable and capable of combining with azocomponents, forming the isomeric thiazolic compounds when treated in an acidic medium.

6. As new products ortho-aminosulphocyanic compounds corresponding probably to the general formula:

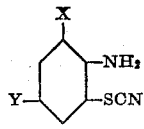

in which formula X means hydrogen or methyl, Y an alkoxygroup or halogen, which products are when dry crystalline substances, having a definite melting point, soluble in the usual organic solvents, diazotizable and capable of combining with azocomponents, forming the isomeric thiazolic compounds when treated in an acidic medium.

7. As a new product the 1-methyl-2-amino-3-sulphocyanogeno-5-chlorobenzene of the formula:

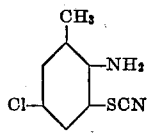

which crystallizes from dilute spirit as colorless needles melting at about 102°, soluble in the usual organic solvents, the diazocompound of which yields a red dyestuff, when combined with R-salt.

In testimony whereof, we affix our signatures.

HANS PAUL KAUFMANN.
MAX SCHUBERT.